March 14, 1939.   H. C. LORD ET AL   2,150,282
METHOD OF FORMING JOINTS AND JOINT STRIPS ADAPTED TO FORM JOINTS
Original Filed June 23, 1931
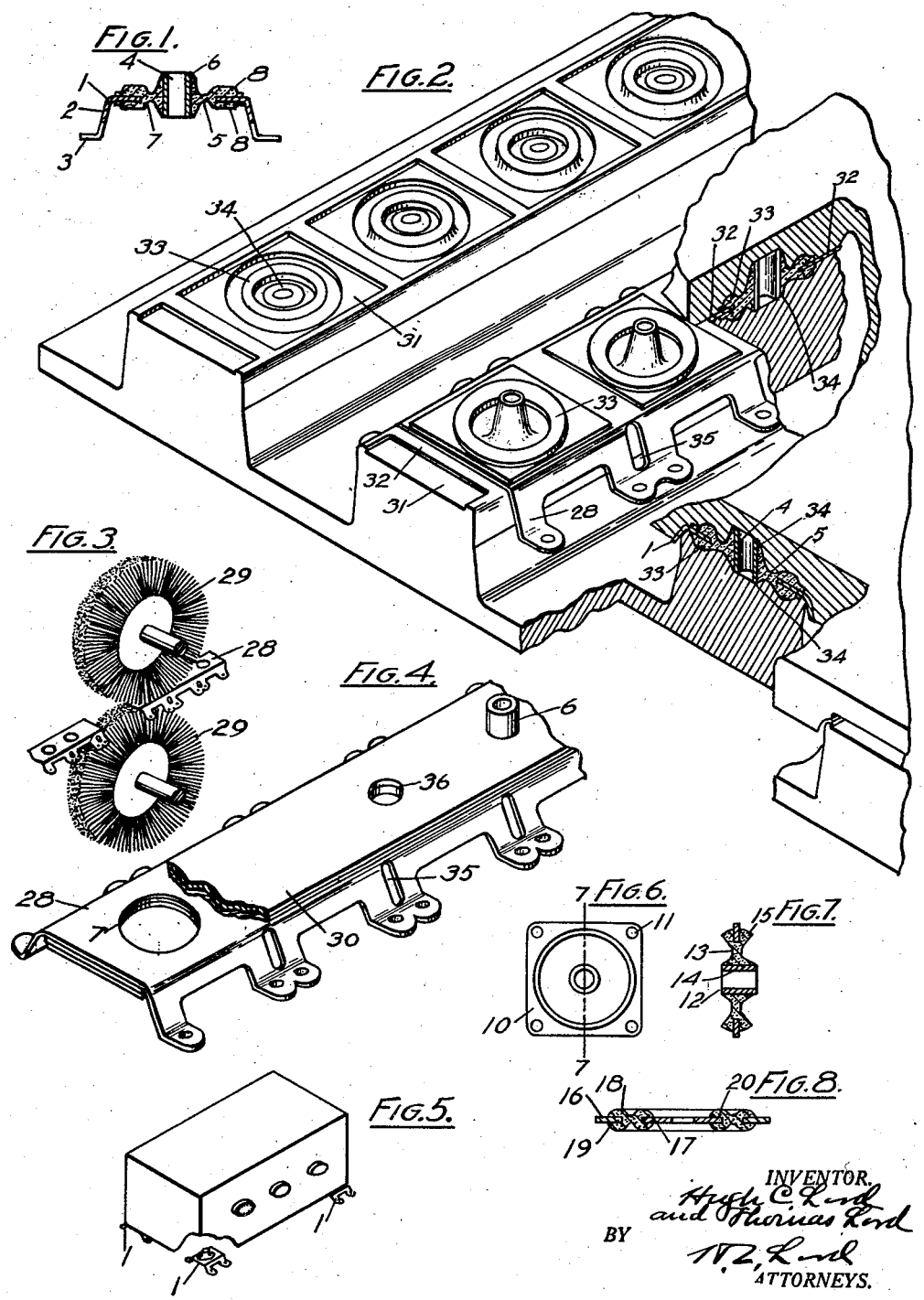

Patented Mar. 14, 1939

2,150,282

UNITED STATES PATENT OFFICE 2,150,282

METHOD OF FORMING JOINTS AND JOINT STRIPS ADAPTED TO FORM JOINTS

Hugh C. Lord and Thomas Lord, Erie, Pa.; said Thomas Lord assignor to said Hugh C. Lord Original application June 23, 1931, Serial No. 546,214. Divided and this application November 3, 1933, Serial No. 696,529

18 Claims. (Cl. 154—2)

This application is a division of application, Serial Number 546,214 (Patent No. 1,996,210). Joints have heretofore been formed by providing an outer member, usually in the form of a tube, with a central member within the tube and rubber secured to the opposing surfaces of the tube and central member. Such joints are used for various purposes, as for instance, as mountings where it is desired to absorb vibration. The present invention is designed to form a joint having load supporting and load carrying means which can be more readily and economically manufactured and to provide a method whereby this may be carried out. With the present invention in its preferred form one of the means, preferably the outer means is formed by utilizing an elongated plate preferably forming side strips which may be formed to provide a base for the joint and also in the preferred form when an outer plate is used it is provided with openings in which the supporting or load carrying means of the joint is arranged with rubber secured to the other means of the joint, preferably to the faces of the plate along the periphery of the opening. In carrying out the invention also one of the means as central members may be provided of cylindrical form and of some axial length, or they may be formed of a flat plate and the rubber secured to the central member forming the flat plate by bonding it preferably to the faces of the plate adjacent to the periphery.

The invention contemplates also the forming of a joint strip from which a plurality of joints may be severed and this is facilitated with the joint having the preferred form of perforated plates, but the invention is not limited in its broader aspects in this respect to this specific joint.

Features and details of the invention will appear from the specification and claims.

A preferred embodiment of the invention is illustrated in the accompanying drawing as follows:—

Fig. 1 shows a central section through a finished joint having supporting feet at its sides and utilizing a tube for its central member.

Fig. 2 shows a perspective view of a mold indicating the joints in process of manufacture, the mold being partly in section and shown with one part of the mold removed.

Fig. 3 shows a perspective view of a manner of processing the plates forming the joint.

Fig. 4 a perspective view of one of the plates showing the manner of laying up the rubber thereon prior to molding.

Fig. 5 a perspective view showing the use of the joint.

Fig. 6 a plan view of a modified joint.

Fig. 7 a section on the line 7—7 in Fig. 6.

Fig. 8 a sectional view of a further modification.

The joint, as shown in Fig. 1, has a plate 1 with side flanges 2 terminating in feet 3. It is provided with a central member 4 and a rubber member 5, the rubber member extending at 6 along the central member 4 which is in the form of a tube and extending over the edges of an opening 7 in the plate 1 forming rings 8 of rubber on opposite faces of the plate adjacent to the periphery of the opening. The rubber between the plate and the central member may be made of the thickness desired, but is ordinarily somewhat thinner than the portions 8 so that the movement of the joint is in this portion of the rubber bridging the space and where used as a mounting as it ordinarily is the rubber sustains the load through the shear of the rubber and thus facilitates the absorption of vibration through the action of the rubber.

In Fig. 5 a joint of this character is shown as carrying a radio instrument 1a and indicates the ordinary manner of use.

In Figs. 6 and 7 a modification of such a joint is shown. Here the outer member, or plate 10 is flat having perforations 11 at its corners by which it may be readily secured. A central tube 12 is connected by a rubber member 13 with the outer plate, the rubber extending at 14 along the tube 12 and extending over the faces of the plate 10 adjacent to the periphery of the opening. Shoulders or rings 15 of the rubber along the surfaces of the plate are thickened and have a relation to the length of the tube 12 so as to form a limiting stop. This relation is so adjusted that when the weight is attached and the natural sag of the rubber under the weight has taken place a free vibration range is established without resistance by the shoulder 15, but any out of the normal shock carries the load on to the shoulders 15 and the movement is thus arrested. The flat plate forms a proper backing for taking this shock.

In Fig. 8 a modified joint is shown in which there is an outer plate 16 having a joint opening arranged therein. A central member 17 is in the form of a plate, the outer periphery of the plate 17 being within the periphery of the opening in the plate 16. A rubber member 18 bridges the space between the plates 17 and 16 and has an extension 19 on the outer periphery bonded to the faces of the plate 16 adjacent to the opening. The rubber likewise has extensions 20 on its inner periphery which extend over and are preferably bonded to the faces of the plate 17. The plate 16 is shown as a flat plate being similar in contour to the plate 12 shown in Fig. 6. It will be understood that the plate 16, or the plate 12 with the form of rubber mounting may have the flanges 2 and feet 3, as indicated in Fig. 1, if this is desired.

In both the structures of Figs. 6 and 8, as well as the structures shown in Fig. 1, they are ordinarily used with the rubber in shear, at least in shear with relation to the vibration thrusts upon it.

In all of these joints it may be preferable to secure the rubber to the joint members by vulcanization so that the rubber of the joint member is put under initial tension through the shrinkage of the rubber.

The structure is of particular advantage by reason of its cheapness, by the fact that the surface of the bonding may be extended as much as may be desirable and it lends itself readily to expansion into large sizes. The wall of rubber 8, Fig. 1, 15, Fig. 7, and 18, Fig. 8, which extends upwardly, or downwardly from the overlapped and bonded surface of the plate is in direct (tension or compression) thrust relation with the overlapped portion of the plate and the rubber within the plate, as the rubber 5 in Fig. 1, 13 in Fig. 7, and the rubber extending radially between the plates in Fig. 8, is in shear. The surrounding wall 15, or 18, is subjected when the central member is under load to a compression stress above the plate and a direct tension stress below the plate. Inasmuch as the compression resistance and the tension resistance of the rubber is very much greater than the resistance of the rubber in shear the yielding axially of this surrounding wall is very litttle compared to the shear movement of the rubber projecting from the plate into the space in and above and below the opening in the plate and this remains true as the depth of the wall in a direction perpendicular to the plate is increased. This surrounding wall, therefore, supports the rubber which yields in shear in much the same manner as a perpendicularly extending metallic wall surrounding the rubber in shear and bonded thereto. The thickness of the wall and the surface of the bonding on the plate may be extended radially as much as desirable to give the proper support for the more active rubber in shear and this wall may also be extended perpendicularly to the face of the plate so as to give a greater depth of rubber subjected to shear. This utilization of a rubber wall supporting the more active rubber in shear may be extended, as in Fig. 8, to the central member and the same functional action takes place with relation to such wall as with the outer wall. In either case, the rubber projects from the plate, or wall, into the shear space and in either case the rubber is supported by the plate and the rubber wall projecting perpendicularly from the plate. While we have shown the inner and outer members in alinement radially, it will be understood that while this is preferable, the central member may be simply within the projected area of the opening.

In fabricating these joints the plate 28 forming the outer member of the joint is fabricated in lengths carrying a plurality of openings. This permits of processing the metal for a plurality of joints in a single operation.

In Fig. 3 buffing wheels 29 are shown operating simultaneously on the top and bottom of a plate, such as is used in the joint shown in Fig. 1. After the plate is properly processed the rubber 30 having a proper bonding face is laid on the top and bottom surfaces of the plate bridging the openings 7 in the plates. Perforations 36 are formed in these strips of rubber and the tube, as the tube 6, inserted in the center of the opening. This plate with the tubes and rubber in this form is placed in the mold, the mold having the cavities 31 receiving the rubber with cut-off, or gate surfaces 32 in the locations at which the plate is to be severed to form the individual joints. The mold has an annular portion 33 shaping it for the rubber to give the rubber the desired strength, and has a central socket 34 bottoming and locating the central tube. The plate is placed in this mold with the rubber placed as in Fig. 4 and a similar upper mold operates on a plurality of joints on the plate. Ordinarily there are not only a plurality of joints on each plate, but surfaces to receive a plurality of plates, as shown in Fig. 2. The plates are preferably provided with perforations 35 in the side flanges so that after the molding operation the main plate and feet may be severed by a direct shearing operation. In this way joint strips from which individual joints may be severed may be very readily fabricated and in a manner cheaper than is practical as to individual joints and while we have described this feature of the invention as forming a particular type of joint we do not wish to be limited in the broader phases of the invention to such particular type in this respect. It also permits of the ready fabrication of such strips with the supporting feet and side walls included and from which the individual joints may be severed, the resilient portion of the mounting being carried between these side strips and supporting a second member of the mounting as clearly shown in Figs. 1 and 4.

In molding the flat center structure, as shown in Fig. 8, the same system is used except that the central plate is centered through the mold by any registering device in the manner similar to the centering of the central tube.

While we have described and shown individual mountings we do not in this application claim the individual mountings as such individual mountings form the subject matter of application No. 546,214 (Patent No. 1,996,210) of which this is a division.

What we claim as new is:—

1. The method of forming joints which consists in forming a plurality of openings in a metal plate, providing said openings with central members, providing rubber in bonding relation to the flat plate and said central members with the members placed within the projected area of the openings and in the rubber, bonding the rubber in place by vulcanization of the body of rubber to a resilient consistency, securing the same to the central member and to the face of the plate, and severing the plate to form individual joints.

2. The method of forming joints which consists in forming a plurality of perforations in a metal plate, providing rubber in bonding relation on both faces of the plate covering said perforations, providing central members in the rubber within the projected areas of the said perforations, vulcanizing the rubber in place to a resilient consistency, bonding the same to the central member and to the faces of the plate adjacent to the perforations, and severing the plate to form individual joints.

3. The methods of making joints which consists in uniting in a unit during vulcanization resilient rubber between supporting and load carrying members spaced apart, one of which is in the form of an elongated strip, the rubber extending in the unit through free space between the members and with the unit so formed adapted to be severed to form individual joints, and severing the unit crosswise of the elongated strip to form a plurality of joints.

4. The method of making joints which consists in uniting in a unit during vulcanization resilient rubber between supporting and load carrying means spaced apart, one of the means including elongated side strips, the rubber extending in the unit through free space between the means, and with the unit so formed adapted to be severed to form individual joints and severing the unit crosswise of the elongated strips to form a plurality of joints.

5. The method of making joints which consists in uniting in a unit during vulcanization resilient rubber between supporting and load carrying means spaced apart, including an elongated metal side strip, the rubber being united with the metal strip by bonding through vulcanization, the rubber extending in the unit through free space between the means, and with the unit so formed adapted to be severed to form individual joints, and severing the unit crosswise of the elongated strip to form a plurality of joints.

6. The method of making joints which consists in uniting in a unit during vulcanization resilient rubber between supporting and load carrying means spaced apart, one of the means including elongated metal side strips, the rubber being united with said means by bonding through vulcanization, the rubber extending in the unit through free space between the means, with the unit adapted to be severed to form individual joints, and severing the unit crosswise of the elongated strip to form a plurality of joints.

7. A joint strip for forming joints comprising supporting and load carrying members spaced apart, one of which comprises an elongated strip, and rubber united with the members during vulcanization extending through free space between the members, the joint strip being adapted to form a plurality of joints when severed.

8. A joint strip for forming joints comprising supporting and load carrying means spaced apart, one of which comprises elongated side strips and rubber united during vulcanization with the means extending through free space between the means, the joint strip being adapted to form, when severed, a plurality of joints.

9. A joint strip for forming joints comprising supporting and load carrying means spaced apart, one of which comprises elongated side strips and rubber united during vulcanization with the means extending through free space between the means, the joint strip being adapted to form, when severed, a plurality of joints, the rubber being disposed to carry the load in shear.

10. A joint strip for forming joints comprising supporting and load carrying means spaced apart, one of which comprises elongated side strips, and rubber united during vulcanization with said means and extending through free space between the means and disposed to carry a load in shear, the side strips extending below the rest of the joint forming a base for the joint.

11. A joint strip for forming joints comprising supporting and load carrying means spaced apart, comprising elongated metal side strips, and rubber united during vulcanization with said means and extending through free space between the means and disposed to carry a load in shear, the side strips extending below the rest of the joint forming a base for the joint.

12. A joint strip for forming joints comprising supporting and load carrying means spaced apart, one of which comprises elongated metal side strips, and rubber united during vulcanization with said means and extending through free space between the means and disposed to carry a load in shear, the side strips extending below the rest of the joint forming a base for the joint, the joint strip adapted, when severed, to form a plurality of joints.

13. The method of forming joints which consists in forming a flat plate with a plurality of perforations, arranging rubber on said plate over said perforations and overlapping the plate at the edges of the perforations with the rubber extending edgewise into the perforations and free to resiliently respond and cushion the joint, vulcanizing the rubber to a resilient consistency, bonding the same by vulcanization to at least one face of the plate adjacent to the perforations, and severing the plate to form individual joints.

14. The method of forming joints which consists in providing a flat plate with a plurality of perforations, placing rubber on both sides of the plate and over said perforations and overlapping the plate at the edge of the perforations with the rubber extending edgewise into the perforations and free to resiliently respond and cushion the joint, vulcanizing the rubber to a resilient consistency, bonding the same by vulcanization at least one face of the plate adjacent to the perforations, and severing the plate to form individual joints.

15. A joint strip for forming joints comprising supporting and load carrying means spaced apart, one of which comprises an elongated strip with perforations at intervals along the strip, and the other means comprising members in the projected areas of the perforations; and rubber united during vulcanization with said means extending through free space between the means and disposed to carry a load in shear.

16. A joint strip for forming joints comprising supporting and load carrying means spaced apart, one of which comprises an elongated strip with perforations at intervals along the strip, and the other means comprising members in the projected areas of the perforations; and rubber united during vulcanization with said means extending through free space between the means and disposed to carry a load in shear, the elongated strip having side portions extending below the rest of the joint forming a base for the joint.

17. A joint strip for forming joints comprising supporting and load carrying members spaced apart, one of which comprises an elongated side strip, the rubber united with the members during vulcanization extending through free space between the members and with the rubber substantially separated transversely intermediate the ends of the strip, the joint strip being adapted to form a plurality of joints when severed at a point of separation of the rubber.

18. The method of making joints which consists in uniting in a unit during vulcanization, resilient rubber between supporting and load carrying members spaced apart, one of which is in the form of an elongated strip, the rubber extending in the unit through free space between the members, and being initially in the form of a strip extending in binding relation along the elongated strip member, and separating transversely in the vulcanizing operation intermediate the ends of the strip whereby the unit so formed is adapted to be severed at a point of separation of the rubber to form individual joints, and severing the unit crosswise of the elongated strip at a point of separation of the rubber to form a plurality of joints.

HUGH C. LORD.
THOMAS LORD.